Oct. 24, 1933.  I. A. WEAVER  1,931,780
BRAKE TESTER FOR VEHICLE WHEELS
Filed May 9, 1931
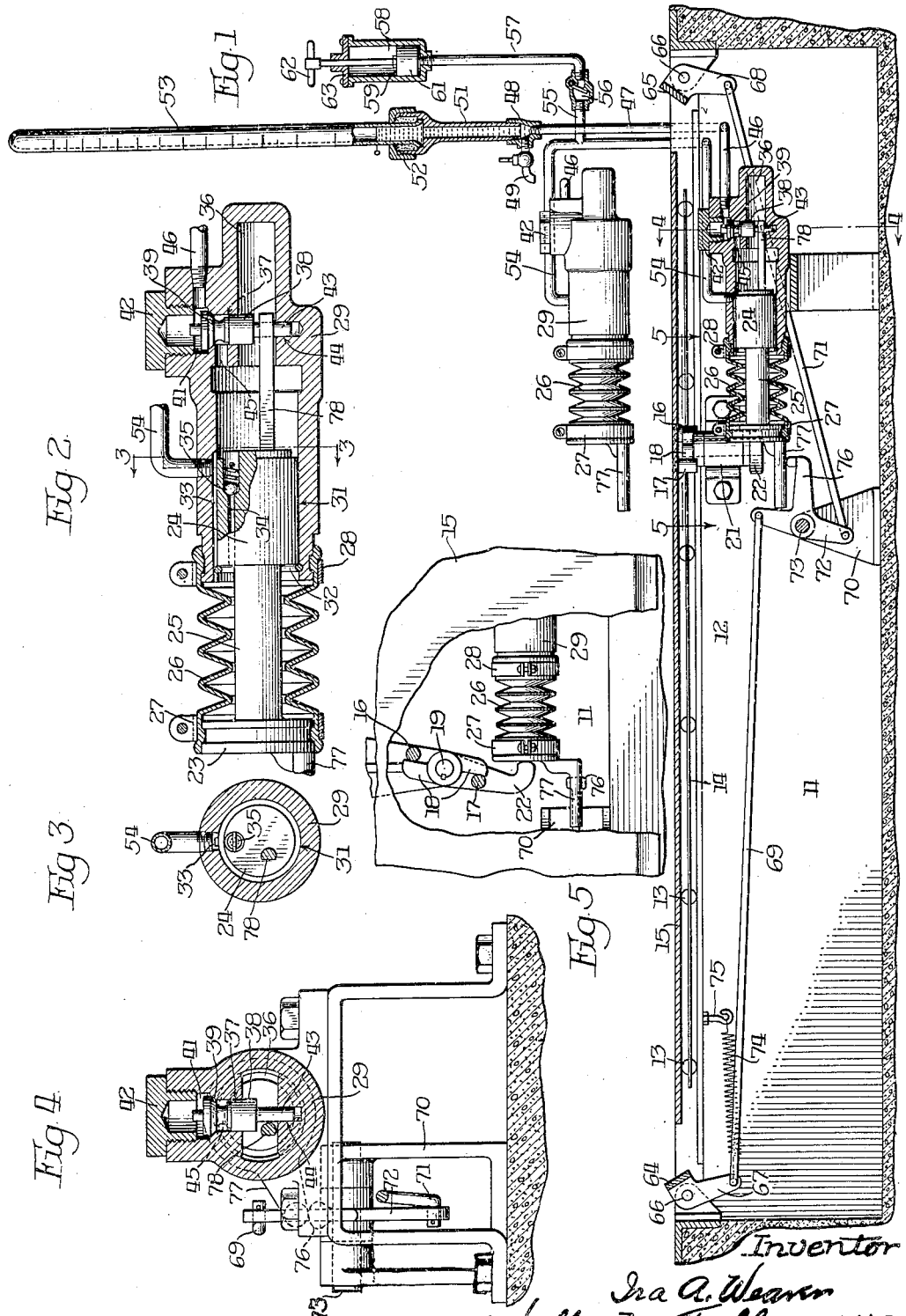
Inventor
Ira A. Weaver
By Walter M. Fuller Atty.

Patented Oct. 24, 1933

1,931,780

UNITED STATES PATENT OFFICE 1,931,780

BRAKE TESTER FOR VEHICLE WHEELS

Ira A. Weaver, Springfield, Ill., assignor to Weaver Manufacturing Company, Springfield, Ill., a corporation of Illinois Application May 9, 1931. Serial No. 536,186

19 Claims. (Cl. 265—97)

The present invention relates to appliances for testing the effectiveness of the brakes of automobiles, and one of the leading purposes of the invention is to provide a construction which is simple in structure, which is easily operated, which is unlikely to become damaged in service, and which can be manufactured at relatively small cost.

One feature of the new construction is that it employs no springs to measure the braking effort or power applied to the wheels, and in the present embodiment of the invention this result is accomplished by forcing a liquid upwardly in a closed tube against an air pressure or air-cushion, the level of the liquid indicating the braking force imposed on the wheel undergoing test.

Another characteristic of this embodiment of the invention is the fact that enough pressure is initially imposed on the air in the tube to permit it to overcome the friction of the plate on which the wheel rests during test and to return it and its associated parts automatically to their normal or original positions.

Another aim or purpose of the invention is to supply a construction of this kind in which no packing is required for the liquid, which is operated by a piston slidable in a cylinder; and, stated somewhat otherwise, the liquid is employed in a closed system and never comes into contact with the atmosphere.

To enable those acquainted with this art to understand the invention, in the accompanying drawing, a present, desirable and preferred embodiment of the invention has been set forth in detail, and like reference characters have been employed throughout the several views to designate the same structural parts.

In this drawing,—

Fig. 1 is a vertical section through one unit of the testing appliance, that is, through one portion adapted to test the brake of one wheel of the vehicle;

Fig. 2 is an enlarged, fragmentary, vertical section through the cylinder and piston and associated and co-operating elements;

Fig. 3 is a vertical, cross section on line 3—3 of Fig. 2;

Fig. 4 is an enlarged, vertical, cross section on line 4—4 of Fig. 1; and

Fig. 5 is a fragmentary, horizontal section on line 5—5 of Fig. 1, a portion of the wheel or cover plate being shown.

Referring to the drawing, it will be observed that the floor of the garage or the like has a pit or relatively shallow chamber 11, near the top of which one or more track-bars 12 is or are provided, on which travel a plurality of anti-friction rollers 13, 13, mounted in a suitable cage 14, the anti-friction structure and the means for operating it being of no substantial importance so long as they supply convenient and effective means on which is mounted a lengthwise-movable wheel or traction plate 15 desirably roughened on its top surface.

As a matter of fact, the improved, novel structure usually comprises four such plates and their associated mechanisms, such as described below, so spaced that the brakes of all four wheels of the vehicle may be tested at the same time, each wheel co-operating with its own individual plate and its indicating or recording medium.

As is clearly shown, each plate is somewhat shorter than the pit or cavity which it in large measure covers, so that the plate may have an appropriate longitudinal movement when the brake is applied to the wheel traveling thereon.

A full description of the construction and mode of operation of one of these plates and its related mechanism will suffice for all.

Two spaced lugs or pins 16, 17 are mounted on and project downwardly from the under face of the wheel-plate 15, and they are in contact with the opposite sides of an arm 18 keyed at its middle on a short, upright shaft 19 oscillatory in a suitable bearing 21, the lower end portion of the shaft having a bent arm 22 fixed thereon.

Inasmuch as the pins or lugs 16, 17 are on opposite sides of the shaft 19, and since the two parts of the arm 18 project in opposite directions from the shaft, it will be clear, that, regardless of the direction of travel of the plate 15, to the left or to the right, as the parts are viewed in Figs. 1 and 5, the arm 22 will be rocked counter-clockwise as it is seen in Fig. 5.

The toe or bent end of arm 22 bears directly against the center of the outer face of an end enlargement or head 23 of a piston or plunger 24, the two parts being more or less widely separated and connected together by a section 25 of substantially-reduced diameter, the three portions 24, 25 and 23 being preferably, but not necessarily, integral throughout.

The terminal portion of a round, rubber or other suitable bellows 26, by means of a split-clamp 27, is fastened around the outer, channeled surface or periphery of the head 23 in fluid-tight relation; that is to say, the plunger-head fits in, and is secured in, the end of the bellows.

A like split-clamp 28 secures the other end of the bellows around the outer, similarly grooved or channeled surface of the end portion of a casting 29, which provides an internal cylinder or chamber 31 in which the piston or plunger 24 is designed and adapted to reciprocate, the piston fitting snugly in such companion cylinder.

One terminal portion of the cylinder is fitted internally with a stop-ring 32 mounted in a circular groove therein and provided for the purpose of limiting or restricting the travel of the piston 24 to the left.

As is depicted most clearly in Fig. 2, the inner face of the cylinder, along its top, has a longitudinal groove or channel 33, which, when the piston is bearing against the stop-ring 32, connects the interior of the bellows with the space in the cylinder to the right of the piston, the full-diameter section of the piston being slightly shorter than the distance from the abutment-ring 32 to the right-hand end of the groove 33.

Obviously, as soon, however, as the piston moves slightly to the right, it will no longer uncover the right-hand end of the groove, and the specified means of communication through such conduit from the one side of the piston to the other will be terminated.

As shown in Fig. 3, the piston has a passage or port 34 extended through it from end to end, and equipped inside of the piston with a spring-closed check-valve 35 which may open to the right when the force of the spring is overcome.

Cylinder 31 connects at its right-hand end with a smaller, longitudinal, extention chamber 36 intersected by an upright, combined bearing and port 37 slidingly accommodating the stem or journal 38 of a valve 39 coacting with a valve-seat at the junction of the port 37 with a larger chamber 41 above, the top of which is closed by a demountable or removable, hollow, screw-threaded plug 42, which acts not only as a closure for the top of the specified space, but which also constitutes a stop for limiting the ascent of the valve, the latter being automatically raised and opening the port when the liquid pressure below it is sufficient to accomplish that result.

Valve 39 also has a smaller stem 43 slidable in a bearing 44 in the lower part of the casting, the latter also having a passage 45 connecting the port 37 with the interior of the cylinder 31.

Thus, when the valve is open in its elevated position, the liquid in the cylinder can flow through passage 45 into the port 37, and from thence into chamber 41, which is connected by a bent pipe 46, through its upright, end portion 47, to the interior of a coupling 48, fitted with a draincock 49, the coupling being joined to a vertical pipe or tube 51 connected at its upper end, at 52, in any appropriate manner, to the lower end of a suitably-graduated indicator or recorder glass-tube 53 closed at its upper end, the graduations being non-uniform as to the spaces between them, for a purpose hereinafter set forth.

Although, so far, only one such brake-testing apparatus or unit, for use with one wheel only at a time, has been illustrated, it is to be understood, as explained hereinbefore, that a plurality of such units are used in association, for example, four, so that the brakes of all four wheels of the vehicles may be examined or tested at the same time.

For the present purpose, however, it will suffice to show the cylinder and bellows construction 29, 26, of only one additional unit (see Fig. 1).

The grooves 33 of both cylinders 31 are connected by pipes 54, 54 to a pipe 55 joined, through a check-valve 56, to an upright pipe 57, on the top end of which a hand-operated pressure-pump 58 is mounted, such pump comprising, in the present instance, a cylinder 59, a valved piston 61 slidable therein and fitted with an exterior handle 62 extended out through a removable cover 63.

At the opposite extremities of the pit 11, beyond the ends of the wheel-plate 15, cross trip-bars 64 and 65, respectively, are hinged at 66, depending arms 67, 68 of the two bars being connected by links 69, 71 to the opposite ends of a lever 72 fulcrumed at its center, at 73, in a bracket 70 in the lower part of the pit.

A spring 74 connects arm 67 to a fixed pin 75, and it normally maintains both of the trip-bars 64, 65 slightly elevated above the top surface of the wheel-plate 15 in a position whereby either may be temporarily or momentarily depressed by the rolling of the vehicle-wheel over it, both bars descending at the same time, under such circumstances, by reason of the action of the specified mechanical connection between them.

Lever 72 has an arm 76 below and in contact with the under side of an arm 77 extended laterally from and integral with, or fixed to, the piston-head 23, and the piston 24 has a finger 78 fixed thereto off-center, and extended longitudinally beyond the piston, so that its free end is just below the valve-steam 38, it being obvious that the chamber 36 is of sufficient length to accommodate the finger 78 in all positions of the piston.

The apparatus operates substantially as follows:—

When the appliance is first installed, all of the cocks or valves 49 are opened and a suitable liquid forced or poured into the system by or through the pump 58, which is common to the entire system, until the liquid overflows through all of the drain cocks, which, of course, are at the same level.

Then all of such cocks are closed and more liquid is forced into the system by the pump until the liquid levels in the several, transparent indicator-tubes 53 are all at their zero graduations.

In forcing in such supplemental liquid, the air in the pipes 51 and tubes 53 above the liquid is compressed a definite or predetermined amount as determined by the difference in level between the zero graduations and the cocks, to produce a pressure sufficient to restore the wheel-plates 15 and their associated parts to their original or initial positions, the check-valve 56 acting to retain the developed pressures in the system.

The further description of the operation of the apparatus will be confined to a consideration of one part or section only, as all of the others work in the same way.

When the vehicle-wheel, the brake of which is to be tested, is driven or rolled on to the plate 15 from either of opposite directions, it will temporarily mechanically depress the trip-bar 64 or 65, as the case may be, but inasmuch as the liquid level in the corresponding indicator-tube 53 is at the zero graduation, no useful function is performed at that time.

While the wheel is rolling lengthwise on the plate after having passed over the entrance tripbar, the operator applies the brake thereto, with the result that the plate is shifted longitudinally an amount or distance proportional to the braking power exerted on the wheel, such movement of the plate being resisted by the air-cushion in the top portion of the indicator-tube.

As the plate shifts in this manner, it pushes the piston to the right through the instrumentality of the finger 22, rock-shaft 19, and one or the other of the pins 16 and 17 acting on its arm 18, as the case may be.

Such travel of the parts is permitted without leakage of liquid by reason of the collapsing or compression of the bellows.

As soon as the piston starts to travel to the right, it closes the previously open end of the channel or groove 33 and it forces the liquid ahead of it out through the port 37, the liquid, by its increase of pressure, opening the valve 39, and from port 37 the liquid flows through chamber 41, pipe 46, 47, coupling 48 and pipe 51, into the graduated glass-tube 53, thus compressing the air in the tube and raising the liquid level in the tube an amount corresponding to the length of travel of the wheel-plate, which in turn conforms to the braking force applied to the wheel.

Hence the reading of the liquid level in the tube with respect to the graduations thereon will indicate the braking power imposed on the wheel, and since the air-cushion in the upper part of the tube becomes more and more compressed for greater rises of the liquid, the graduations on the tube are not uniform distances apart, but are progressively less and less to correspond to equal increases in the braking action.

As soon as the movement of the wheel-plate stops, the valve 39 closes automatically and prevents the liquid in the indicating-tube from receding, thus maintaining the liquid-level at the pressure-recording elevation in the tube, which gives the operator ample time to view it.

When the vehicle-wheel rolls off of the plate, it will automatically rock the other trip-bar, 64 or 65, down by traveling over it, which will occasion a like depression of the other or companion trip-bar, owing to the positive mechanical connection between them, the result being the elevation of arm 76 and the partial turning of the piston 24 in its cylinder, due to the continued engagement of arm 76 with its companion arm 77 on the piston-head 23.

Such rocking of the piston elevates its off-center or eccentric pin or finger, 78, which lifts and opens the valve 39, thus permitting the quick return of the proper portion of the liquid, under the air pressure imposed on it, into the cylinder, the lowering of the liquid-level in the indicator-tube to its zero graduation, and the pushing of the piston to its left-hand limit of travel, the wheel-plate at the same time, by reason of the movement of the piston, being restored to its original or initial, central position, whereupon the appliance is again ready for another brake-testing operation.

The height of the drain cock 49 in relation to the zero-graduation line of the tube is such that the amount of the liquid forced into the pipe by the pump after the cock is closed, as explained above, will create an air pressure in the tube, above the tube, sufficient to assure the quick restoration of the liquid to its normal position and the proper return of the specified mechanical elements to their original positions.

From what precedes, it will be noted that in this appliance the wheel-plate operates a piston or plunger in an open-end cylinder, a suitable bellows being employed at such end to close the system.

It will also be observed that, in the new apparatus, no springs are used to measure the pull imposed on the wheel-plate, the air-cushion in the closed tube, in association with the liquid, taking the place of any such springs.

The bellows referred to is capable of standing an initial pressure sufficient to effect the return of the wheel-plate to its original location, and this pressure may approximate five pounds per square inch, the capacity of the bellows in relation to that of the cylinder being such that, when the piston moves forwardly, the volume within the bellows will not be materially increased or decreased.

The purpose of employing the groove 33 in the cylinder is so that when the cylinder in advance of the piston is filled with liquid from the supply pump, the bellows will be similarly filled.

If during the power stroke of the piston any leakage should occur past the piston, the bellows would then contain a surplus or extra supply of the liquid, and to allow the pressures to equalize on each side of the piston, the check-valve 35 is provided.

From the foregoing description, it will be appreciated that the piston can move freely in the cylinder and that the rubber bellows eliminates the requirement for any packing, and also allows the piston to rotate the slight amount necessary to lift the valve from its seat.

Therefore, no packing is used in the valve-trip mechanism; or, in other words, the appliance comprises a closed system in which the liquid never comes into contact with the outer atmosphere. This is of substantial importance due to the fact that the liquid generally used in a system of this kind, where rubber is employed, must be free from mineral oils, and the mixture should be of vegetable matter, preferably glycerine and alcohol, which will not readily attack the rubber bellows.

Due to the closed nature of the system, there is, of course, no evaporation of the alcohol.

It will be understood that the valve-cap is readily removable, which makes the valve easily accessible, that the entire structure is extremely simple and adequately sensitive, and that no springs or weights are embodied in the recording system.

If it ever becomes necessary to drain the liquid from the system, the appliance can be easily restored to operative condition by manipulation of the drain cocks and the supply pump in the manner described, the parts being so related that the proper air pressure will be present in the indicator-tube when the liquid-level is at the zero reading.

The invention is stated in the appended claims, but it is to be borne in mind that material changes may be incorporated in the specific structure illustrated and described without departure from such invention and without the loss of any of its substantial advantages.

I claim:

1. In a vehicle-wheel brake-tester, the combination of a movably-mounted member on which the vehicle-wheel is adapted to travel, a closed conduit, a liquid partially filling said conduit with the remainder only of said conduit above said liquid occupied by gas, and means actuated by the movement of said member due to the application of the brake to the wheel thereon to force said liquid along said conduit and to compress the gas thereby, the changed position of the liquid-level indicating the extent of movement of the member, such member movement being opposed by the resistance of the gas to compression.

2. In a vehicle-wheel brake-tester, the combination of a movably-mounted wheel-plate on which the wheel of the vehicle is adapted to travel and during which travel the brake is applied to the wheel, a cylinder, a closed conduit connected to the interior of said cylinder, a piston slidable in said cylinder, means to slide said piston in said cylinder by the movement of said wheel-plate, and a liquid filling the otherwise unoccupied part of said cylinder and a portion of said conduit, the remainder only of said conduit above said liquid being filled with gas, whereby compression of said gas by the movement of said piston and liquid resists the movement of said plate and the changed position of the liquid-level indicates the extent of movement of said plate.

3. In a vehicle-wheel brake-tester, the combination of a movably-mounted wheel-plate on which the wheel of the vehicle is adapted to travel and during which travel the brake is applied to the wheel, a cylinder, a closed conduit connected to the interior of said cylinder, a piston slidable in said cylinder, means to slide said piston in said cylinder by the movement of said wheel-plate, a liquid filling the otherwise unoccupied part of said cylinder and a portion of said conduit, the remainder of said conduit above said liquid being filled with gas, whereby said gas is compressed by the movement of said piston and liquid, means acting automatically to maintain at least the top portion of the liquid in its displaced position in said conduit, and means to operate said maintaining means to permit said displaced portion to return to its original position and to allow said gas to expand to its normal condition.

4. In a vehicle-wheel brake-tester, the combination of a movably-mounted wheel-plate on which the wheel of the vehicle is adapted to travel and during which travel the brake is applied to the wheel, a cylinder, a closed conduit connected to the interior of said cylinder, a piston slidable in said cylinder, means to slide said piston in said cylinder by the movement of said wheel-plate, a liquid filling the otherwise unoccupied part of said cylinder and a portion of said conduit, the remainder of said conduit above said liquid being filled with gas, a valve in said conduit automatically opened by the piston-propelled liquid to permit its passage therethrough and automatically closing to maintain the liquid in said conduit beyond said valve in its displaced position, and means to open said valve to allow expansion of the compressed gas and to permit the return of the displaced liquid to its normal position.

5. In a vehicle-wheel brake-tester, the combination of a movably-mounted wheel-plate on which the wheel of the vehicle is adapted to travel and during which travel the brake is applied to the wheel, a cylinder, a closed conduit connected to the interior of said cylinder, a piston slidable in said cylinder, means to slide said piston in said cylinder by the movement of said wheel-plate, a liquid filling the otherwise unoccupied part of said cylinder and a portion of said conduit, the remainder of said conduit above said liquid being filled with gas, a valve in said conduit automatically opened by the piston-propelled liquid to permit the passage of the latter therethrough and automatically closing to maintain the liquid in said conduit beyond said valve in its displaced position, and means operated by said wheel as it leaves the tester to open said valve temporarily to allow expansion of the compressed gas and to permit the return of the displaced liquid to its normal position.

6. In a vehicle-wheel brake-tester, the combination of a movably-mounted wheel-plate on which the wheel of the vehicle is adapted to travel and during which travel the brake is applied to the wheel, a cylinder, a closed conduit connected to the interior of said cylinder, a piston slidable in said cylinder, means to slide said piston in said cylinder by the movement of said wheel-plate, a liquid filling the otherwise unoccupied part of said cylinder and a portion of said conduit, the remainder of said conduit above said liquid being filled with gas, a valve in said conduit automatically opened by the piston-propelled liquid to permit its passage therethrough and automatically closing to maintain the liquid in said conduit beyond said valve in its displaced position, means to turn said piston in said cylinder, and means operated by such turning movement of said piston to open said valve to allow the compressed gas to expand and to permit the displaced liquid to return to its normal position.

7. In a vehicle-wheel brake-tester, the combination of a movably-mounted wheel-plate on which the wheel of the vehicle is adapted to travel and during which travel the brake is applied to the wheel, a cylinder, a closed conduit connected to the interior of said cylinder, a piston slidable in said cylinder, means to slide said piston in said cylinder by the movement of said wheel-plate, a liquid filling the otherwise unoccupied part of said cylinder and a portion of said conduit, the remainder of said conduit above said liquid being filled with gas, a valve in said conduit automatically opened by the piston-propelled liquid to permit the passage of the latter therethrough and automatically closing to maintain the liquid in said conduit beyond said valve in its displaced position, means operated by said wheel as it leaves the tester to turn said piston in said cylinder, and means operated by such turning movement of said piston to open said valve to allow the compressed gas to expand and to permit the displaced liquid to return to its normal position.

8. In a vehicle-wheel brake-tester, the combination of a movably-mounted wheel-plate on which the wheel of the vehicle is adapted to travel and during which travel the brake is applied to the wheel, a cylinder, a closed conduit connected to the interior of said cylinder and including a transparent indicator-tube graduated unequally to agree to equal differences in the braking forces applied to the wheel, a piston slidable in said cylinder, means to slide said piston in said cylinder by the movement of said wheel-plate, and a liquid filling the otherwise unoccupied part of said cylinder and a portion of said conduit with the remainder only of the conduit above said liquid filled with gas, the liquid-level in said indicator-tube co-operating with said graduations thereof to register the braking force applied to the wheel.

9. In a vehicle-wheel brake-tester, the combination of a movably-mounted wheel-plate on which the wheel of the vehicle is adapted to travel and during which travel the brake is applied to the wheel, a cylinder, a closed conduit connected to the interior of said cylinder and including a transparent graduated indicator-tube, a piston slidable in said cylinder, means to slide said piston in said cylinder by the movement of said wheel-plate, and a liquid filling the otherwise unoccupied part of said cylinder and a portion of said conduit with the remainder only of the conduit above said liquid filled with gas, the liquid-level in said indicator-tube co-operating with the graduations thereof to register the braking force applied to the wheel.

10. In a vehicle-wheel brake-tester, the combination of a movably-mounted wheel-plate on which the vehicle-wheel is adapted to travel and during which travel the brake is applied to the wheel, a cylinder, a conduit connected to the interior of said cylinder, a piston slidable in, and adapted to turn in, said cylinder, a liquid occupying the otherwise unoccupied space in said cylinder and partially filling said conduit, a bellows connected to one end of said cylinder and to a portion of said piston forming a fluid-tight connection between the two permitting the specified movements of said piston, means to slide said piston by the movement of said plate, a valve in said conduit adapted to open to permit the piston-propelled liquid to pass through it and to close upon cessation of such liquid propulsion to retain that part of the liquid beyond the valve in its displaced position, means to turn said piston, and means actuated by said piston-turning movement to open said valve to permit said displaced liquid to flow back to its original position.

11. In a vehicle-wheel brake-tester, the combination of a movably-mounted wheel-plate on which the vehicle is adapted to travel and during which travel the brake is applied to the wheel, a cylinder, a closed conduit connected to the interior of said cylinder, a piston slidable in, and adapted to turn in, said cylinder, a liquid occupying the otherwise unoccupied space in said cylinder and partially filling said conduit, the remainder of the conduit above said liquid being filled with gas, a bellows connected to one end of said cylinder and to a portion of said piston forming a fluid-tight connection between the two permitting the specified movements of said cylinder, means to slide said piston by the movement of said plate, a valve in said conduit adapted to open automatically to permit the piston-propelled liquid to pass through it and to close automatically upon cessation of such liquid propulsion to retain that part of the liquid beyond the valve in its displaced position, means to turn said piston, and means actuated by said piston-turning movement to open said valve to allow said compressed gas to expand and to permit said displaced liquid to flow back to its original position.

12. In a vehicle-wheel brake-tester, the combination of a movably-mounted wheel-plate on which the vehicle-wheel is adapted to travel and during which travel the brake is applied to the wheel to move the plate, a cylinder, a closed conduit connected to the interior of said cylinder, and including a graduated glass-tube, a piston slidable in, and adapted to turn in, said cylinder, a liquid occupying the otherwise unoccupied space in said cylinder and partially filling said conduit with the remainder of the conduit above the liquid filled with gas, the liquid-level being visible in said glass tube, a bellows connected to one end of said cylinder and to said piston forming a fluid-tight connection between the two and permitting the specified movements of said piston, means to slide said piston in said cylinder by the movement of said plate, a valve in said conduit adapted to open automatically to permit the piston-propelled liquid to pass through it and to close automatically upon cessation of such liquid propulsion to retain that part of the liquid beyond the valve in its displaced position, means operated by said wheel as it passes off of said plate to turn said piston, and means actuated by said piston-turning movement to open said valve to allow said compressed gas to expand and to permit said liquid to flow back to its original position.

13. In a vehicle-wheel brake-tester, the combination of a movably-mounted wheel-plate on which the wheel of the vehicle is adapted to travel and during which travel the brake is applied to the wheel, a cylinder, an upwardly-directed graduated conduit connected to the interior of said cylinder, a piston slidable in said cylinder, means to slide said piston in said cylinder by the movement of said wheel-plate, a drain-cock for said conduit lower than a predetermined graduation of said conduit, and means to pump a liquid into said cylinder and conduit.

14. In a vehicle-wheel brake-tester, the combination of a movably-mounted wheel-plate on which the wheel of the vehicle is adapted to travel and during which travel the brake is applied to the wheel, a cylinder, a closed upwardly directed graduated conduit connected with the interior of said cylinder, a piston slidable in said cylinder, means to slide said piston in said cylinder by the movement of said wheel-plate, a drain-cock for said conduit lower than a predetermined graduation of said conduit, means to pump a liquid into said connected cylinder and conduit, whereby when the introduced liquid overflows at the drain-cock, the latter may be closed and further liquid forced into the system until its level registers with a predetermined graduation of said conduit.

15. In a vehicle-wheel brake-tester, the combination of a movably-mounted wheel-plate on which the wheel of the vehicle is adapted to travel and during which travel the brake is applied to the wheel, a cylinder, a closed conduit connected to the interior of said cylinder, a piston slidable in said cylinder, means to slide said piston in said cylinder by the movement of said wheel-plate, and a liquid filling the otherwise unoccupied part of said cylinder and a portion of said conduit, the remainder only of said conduit above said liquid being filled with compressed gas, the pressure of which is sufficient to return the shifted wheel-plate and its associated mechanism to normal position, said gas-filled portion of said conduit being transparent so that the liquid-level therein may be seen to determine the braking force applied to said plate.

16. In a vehicle-wheel brake-tester, the combination of a movably-mounted wheel-plate on which the vehicle-wheel is adapted to travel and during which travel the brake is applied to the wheel, a cylinder, a closed conduit connected to the interior of said cylinder, a piston slidable in said cylinder, a liquid accupying the otherwise unoccupied space in said cylinder and partially filling said conduit, the remainder of said conduit being filled with gas, a bellows connected to one end of said cylinder and to a portion of said piston forming a fluid-tight connection between the two permitting the specified movement of said piston, means to slide said piston by the movement of said plate, a valve in said conduit adapted to open to permit the piston-propelled liquid to pass through it and to close upon cessation of such liquid propulsion to retain a part of the liquid beyond the valve in its displaced position, means to open said valve to permit said displaced liquid to flow back to its original position, there being a port extended through said piston connecting the interior of said bellows with said cylinder on the opposite side of said piston, and a check-valve in said port.

17. In a vehicle-wheel brake-tester, the combination of a movably-mounted wheel-plate on which the vehicle-wheel is adapted to travel and during which travel the brake is applied to the wheel, a cylinder, a closed conduit connected to the interior of said cylinder, a piston slidable in said cylinder, a liquid occupying the otherwise unoccupied space in said cylinder and partially filling said conduit, the remainder of the conduit above said liquid being filled with gas, a bellows connected to one end of said cylinder and to a portion of said piston forming a fluid-tight connection between the two permitting the specified movement of said piston, means to slide said piston by the movement of said plate, a valve in said conduit adapted to open to permit the piston-propelled liquid to pass through it and to close upon cessation of such liquid propulsion to retain a part of the liquid beyond the valve in its displaced position, means to open said valve to permit said displaced liquid to flow back to its original position, and a stop limiting the travel of said piston away from said conduit, said cylinder having a longitudinal groove in its inner surface of a sufficient length to connect the interior of said bellows with the interior of said cylinder and the opposite side of said piston when the latter is against said stop, the travel of said piston away from said stop closing said groove connection.

18. In a vehicle-wheel brake-tester, the combination of a plurality of movably-mounted members on each of which a wheel of a vehicle is adapted to travel, a closed conduit for each of said members, liquid partially filling said conduits, the remaining portions of said conduits above their liquids being occupied by a gas, means actuated by the movements of said members due to the application of the brakes to the wheels thereon to reduce the volumes of their respective conduits whereby to change the liquid levels therein and to compress the gas, and means to connect said conduits together in the unoperated condition of said members to equalize the pressures therein and to terminate such connection upon initiation of movement of said members whereby to obtain individual indications of the braking effects applied to the wheels by the changes of the liquid levels in the conduits.

19. In a vehicle-wheel brake-tester, the combination of a plurality of movably-mounted members on each of which the wheel of a vehicle is adapted to travel, a closed conduit for each of said members, a liquid partially filling said conduits, the remaining portions only of said conduits above their liquids being occupied by a gas, and means actuated by the movements of said members due to the application of the brakes to the wheels thereon to reduce the volumes of their respective conduits whereby to change the liquid-levels therein and to compress the gas.

IRA A. WEAVER.